(12) United States Patent
Burke et al.

(10) Patent No.: US 6,752,069 B1
(45) Date of Patent: Jun. 22, 2004

(54) BEVERAGE BREWER WITH POUR OVER FEATURE

(75) Inventors: Michael Burke, Clarksville, IN (US); Robert C. McNeill, Georgetown, IN (US); Keith W. Enscoe, Lanesville, IN (US)

(73) Assignee: Grindmaster Corporation, Louisville, KY (US)

( * ) Notice: Subject to any disclaimer, the term of this patent is extended or adjusted under 35 U.S.C. 154(b) by 78 days.

(21) Appl. No.: 10/190,775

(22) Filed: Jul. 8, 2002

(Under 37 CFR 1.47)

Related U.S. Application Data (60) Provisional application No. 60/353,838, filed on Feb. 4, 2002.

(51) Int. Cl.[7] ............................................. A47J 31/00
(52) U.S. Cl. ........................ 99/280; 99/284; 99/285; 99/300
(58) Field of Search .................... 99/280, 284, 285, 99/300, 307

(56) References Cited

U.S. PATENT DOCUMENTS

| | | | | |
|---|---|---|---|---|
| 4,464,981 A | * | 8/1984 | Stover | 99/280 |
| 5,063,836 A | * | 11/1991 | Patel | 99/281 |
| 5,193,437 A | * | 3/1993 | Roberts et al. | 99/280 |
| 5,375,508 A | * | 12/1994 | Knepler et al. | 99/280 |
| 5,875,703 A | | 3/1999 | Rolfes | |
| 6,305,267 B1 | | 10/2001 | Rolfes | |

* cited by examiner

Primary Examiner—Reginald L. Alexander
(74) Attorney, Agent, or Firm—Stites & Harbison, PLLC; David W. Nagle, Jr.; Brooke J. Egan (57) ABSTRACT

A beverage brewer with two modes of operation, an automatic mode in which water automatically flows into a reservoir for heating the water and is dispensed over beverage concentrate during a brewing cycle and a manual mode in which water is manually added to the brewer and dispensed over the beverage concentrate during the brewing cycle. The beverage brewer has a water level sensor system signaling the water level for auto-fill from an external water supply or fill by manual pour-over operations.

13 Claims, 8 Drawing Sheets

BEVERAGE BREWER WITH POUR OVER FEATURE

CROSS REFERENCES TO RELATED APPLICATIONS

This application claims priority from U.S. Provisional Application Serial No. 60/353,838 filed Feb. 4, 2002, and relates to a beverage brewer with a pour over feature. The entire disclosure contained in U.S. Provisional Application Serial No. 60/353,838 is incorporated herein by this reference.

BACKGROUND

The present invention relates to beverage brewers in general, and, more specifically, to beverage brewers having two modes of operation, an automatic mode in which water automatically flows into a reservoir for heating the water and is dispensed over beverage concentrate during a brewing cycle and a manual mode in which water is manually added to the brewer and dispensed over a beverage concentrate during the brewing cycle.

Beverage brewers are common in commercial enterprise, especially common in coffee brewing in office, hotel and restaurant services. Traditionally brewers have a reservoir containing water to be used in the beverage brewing process. Water can be pumped into the reservoir from an external water supply or poured into a receiving basin connected to the reservoir. When the operator wishes to brew a beverage such as coffee, the operator activates the controls so that hot water from the reservoir exits through ground coffee. Or if the operator wishes simply to have hot water for hot chocolate, tea, soups, etc., many coffee making machines are equipped with a second outlet with a spigot for dispensing water on an as needed basis.

The prior art includes beverage brewers with reservoir level sensing controls, such as U.S. Pat. No. 5,063,836 issued to Patel and brewers with automated reservoir filling capabilities, such as U.S. Pat. No. 6,305,267 issued to Rolfes.

However, there remains a need for a beverage brewer having a water level sensor indicating when water is needed in the reservoir for beverage brewing operations and which activates either the external water supply or manual pour-over operations to add water to the reservoir.

Therefore, it is a paramount object of the present invention to provide a beverage brewer having a water level sensor indicating when water is needed in the reservoir for beverage brewing operations and which activates either the external water supply or manual pour-over operations to add water to the reservoir.

It is another object of the present invention to provide a beverage brewer that is capable of having the reservoir filled from an external water source or manually at the discretion of the operator.

It is yet another object of the present invention to provide a beverage brewer with energy saving features that deactivate decanter warmers.

These and other objects and advantages of the present invention will become apparent upon a reading of the following description.

SUMMARY OF THE INVENTION

The present invention pertains to a beverage brewer having two modes of operation, an automatic mode in which water automatically flows into a reservoir for heating the water and is dispensed over beverage concentrate during a brewing cycle and a manual mode in which water is manually added to the brewer and dispensed over a beverage concentrate during the brewing cycle. The brewer apparatus includes a water level sensor extending into the reservoir for sensing the presence of the water level of the reservoir; a water replacement system with at least one water inlet valve in communication with the reservoir; a brewing system with a water outlet, a brewer valve, and a hot water distribution system for distributing hot water over the beverage concentrate held in a brew basket; a controller for controlling multiple functions of said brewer, and a user operated control panel for providing a brew signal to said controller and for displaying the status of certain operations of said brewer.

DESCRIPTION OF THE PREFERRED EMBODIMENT

Figure 1:
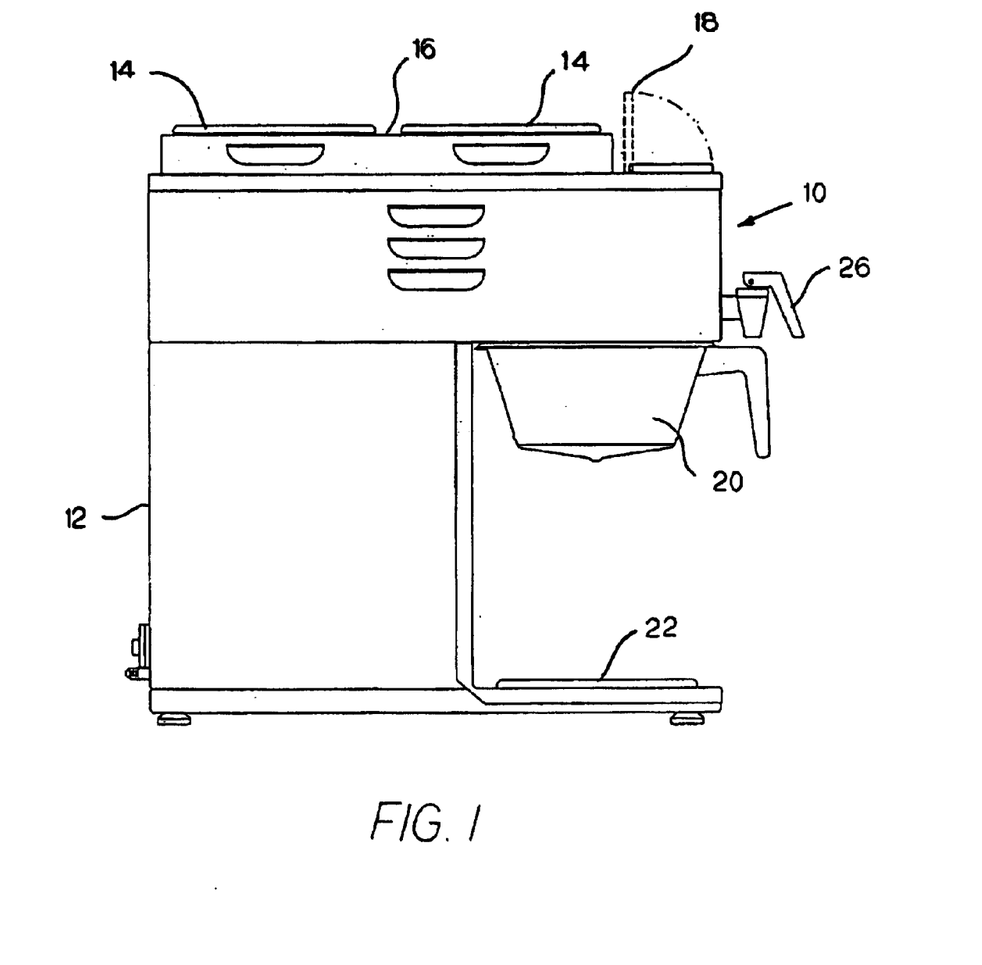
FIG. 1 is a elevation view of a brewer accordance with the present invention.
Figure 2:
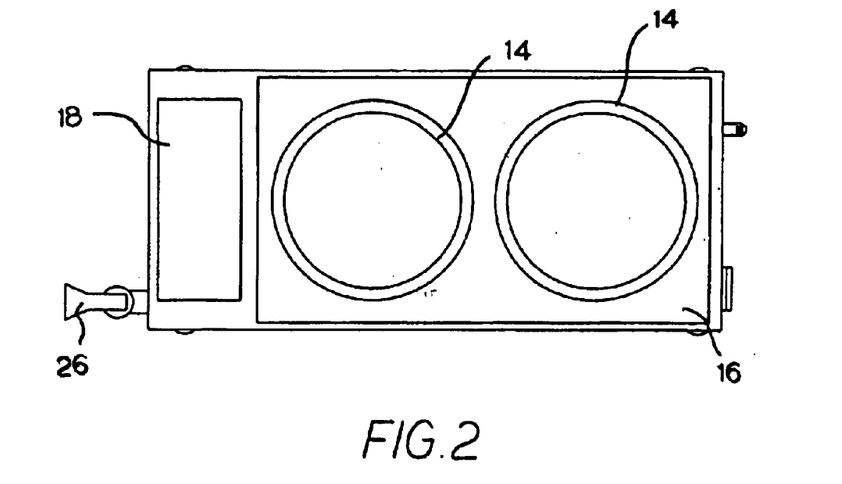
FIG. 2 is a top view of the brewer of FIG. 1.
Figure 3:
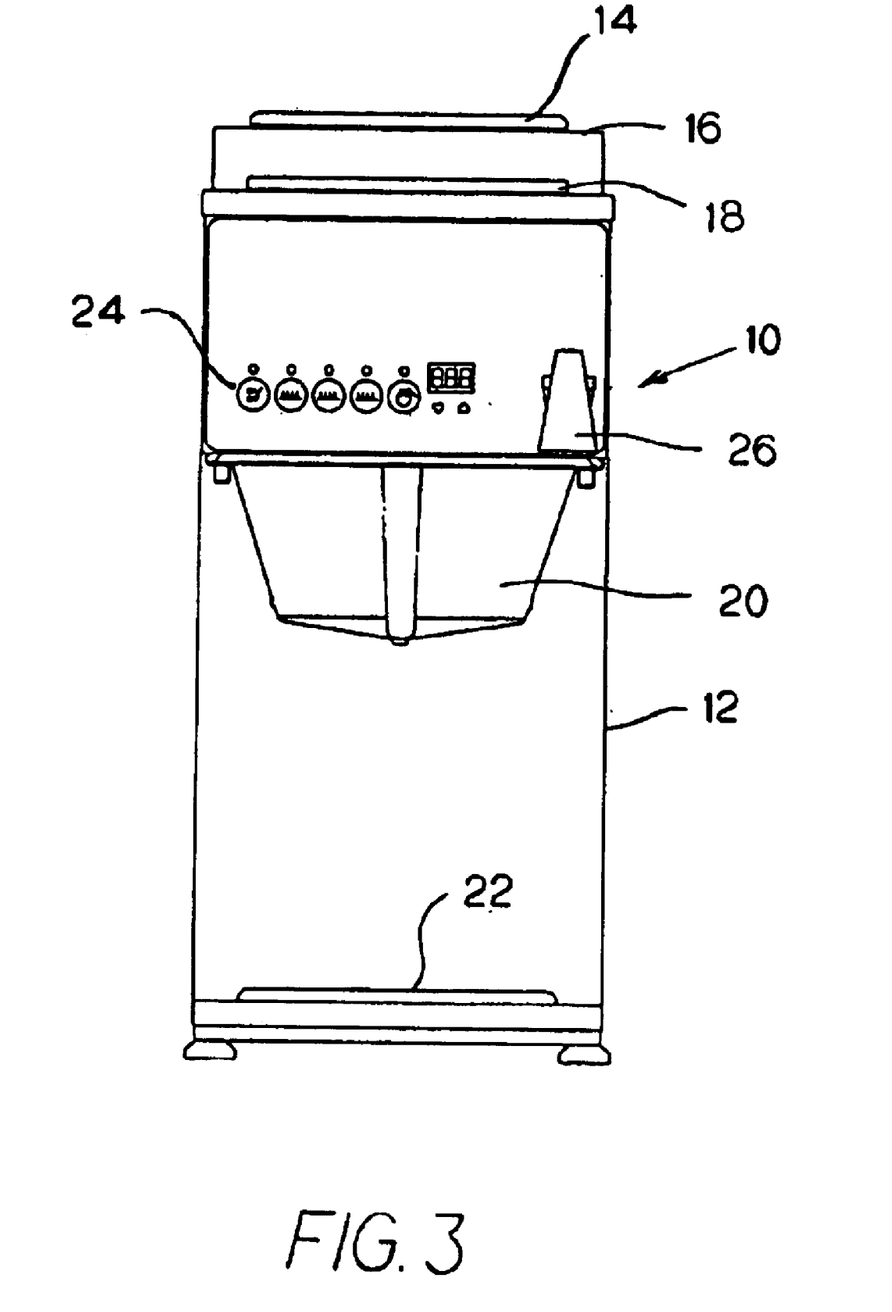
FIG. 3 is a front elevation view of the brewer of FIG. 1.

Reference is now made to the view provided by FIGS. 1–3. A brewing apparatus, depicted in side view by FIG. 1, is shown generally by character numeral 10. While the brewer 10 is capable of brewing any brewed beverage using a beverage concentrate, such as coffee, tea or hot chocolate, the discussion below is limited to coffee brewing operations.

From the views provided by FIGS. 1–3, the exterior of the brewer 10 includes housing 12 that supports a pair of warmer plates 14 on its upper surface 16 and a pivoting lid 18. A brew basket 20 is removably mounted to the under front surface of frame 12 over a warmer plate 22. The brew basket 20 holds the ground coffee for the brewing process, discussed in further detail below. A user operated control panel 24 may be seen on the front surface of housing 12 along with a hot water spigot 26.

Figure 4:
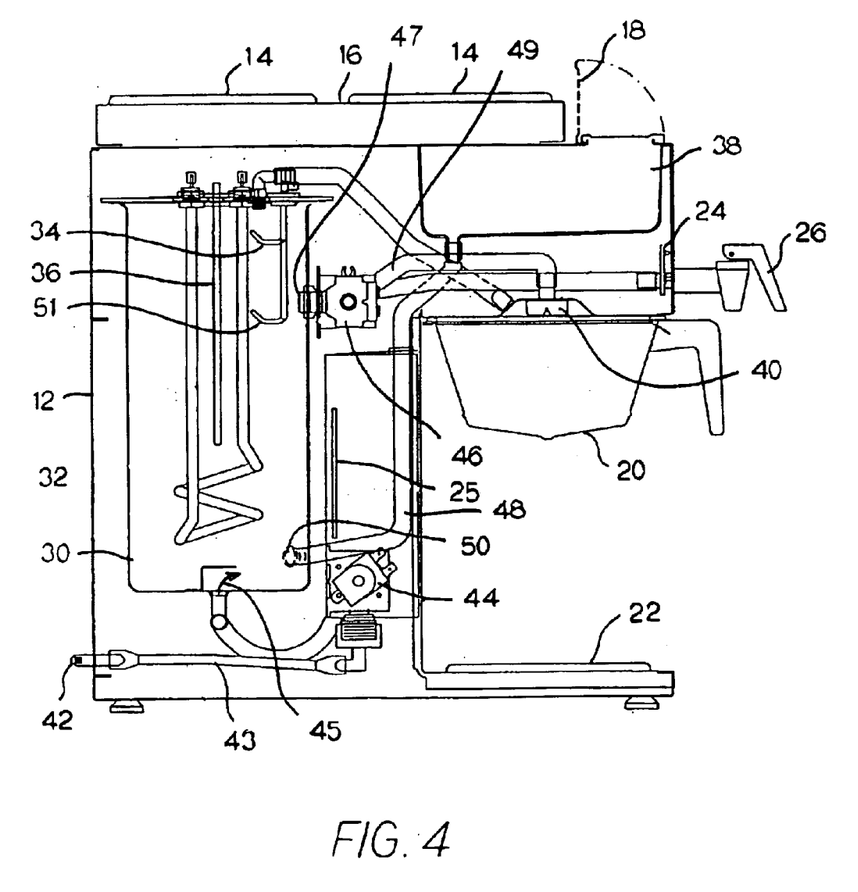
FIG. 4 is a side view of the brewer of FIG. 1 with side panels and the walls of the heating reservoir removed to show the various internal components and water lines.
Figure 5:
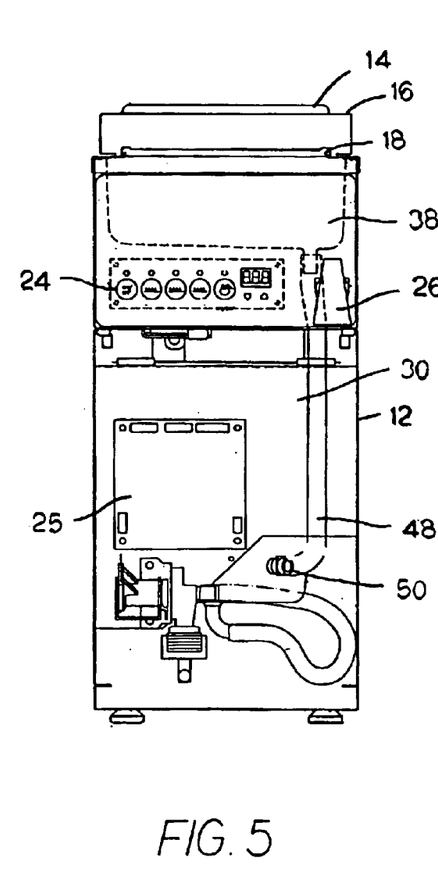
FIG. 5 is a front view of the brewer of FIG. 1 with the front panels being removed to show various internal components of the brewer.

As may be seen in FIGS. 4 and 5, a water reservoir 30 is positioned within the interior of housing 12. Reservoir 30 includes a heating coil 32, a water level sensor 34, a heater sensor 51 and a thermistor 36. The thermistor 36 is a high sensitivity thermometer connected to a heating coil 32 in the interior of the reservoir 30. In the preferred embodiment, the thermistor 36 is capable of reading the reservoir 30 temperature from 175° F.–202° F. +/–1° F. Also positioned within the housing 12 is a pour-over pan or water basin 38 that has an opening ordinarily closed by lid 18. A hot water distribution system positioned within the housing 12 includes a water liner 49 and a connected spray head 40 mounted below the water basin 38 in position to evenly distribute hot water over the ground coffee (not shown) held in the brew basket 20.

Various water lines connect the operating components of the brewer 10 to permit a controlled flow of water into the reservoir under different conditions. A water supply line 42 from a remote water supply leads to an inlet valve 44. Water moves from the water supply line 42, under local water pressure, along the transport line 43 through the inlet valve 44 to a water inlet 45 in the bottom portion of the reservoir 30 where it is heated by heater coil 32 and rises to the top of reservoir 30. A brew valve 46, when activated, allows water to exit the reservoir 30 through an outlet 47 and the connected water line 49 leading to the spray head 40. Under manual operating circumstances (described below) water poured into the water basin 38 moves directly under its hydraulic pressure along water line 48 directly to an inlet 50 near the bottom portion of reservoir 30. Water entering the reservoir 30 from the water basin 38 undergoes the same process inside the reservoir 30 as the water entering the reservoir 30 by the water inlet 45. Thus, the water entering the reservoir 30 through the inlet 50 is heated by the heater coil 32 and rises to the top of the reservoir 30 for use in the brewing process.

The brewer 10 is provided with a controller 25 connected to the user operated control panel 24 on the front surface of the housing 12. The controller 25 is a microprocessor based design on an open board with moisture resistant coating. In the preferred embodiment, this moisture resistant coating is on both sides of the control board. The controller 25 is powered by an external transformer that is matched to the line voltage being supplied to the brewer 10. The controller 25 is linked to the user operated control panel 24 by a ribbon cable (not shown). The controller 25 is connected to the thermistor 36 to monitor the water temperature within the reservoir 30 and connected to the heating coil 32 for reservoir 30 temperature management. By these connections, the controller 25 establishes the heating range of the water within the reservoir 30 for the duration of the brewing cycle. As will be discussed below, the controller 25 is responsive to the water level sensor 34 for opening and closing the water inlet valve 44. In the preferred embodiment, the controller 25 has a counter that counts the number of brows made in the brewer 10. This counter can be linked to the touch pad 24 and displayed on the touch pad 24 when the brewer 10 is initially started up from an off position.

Figure 5A:
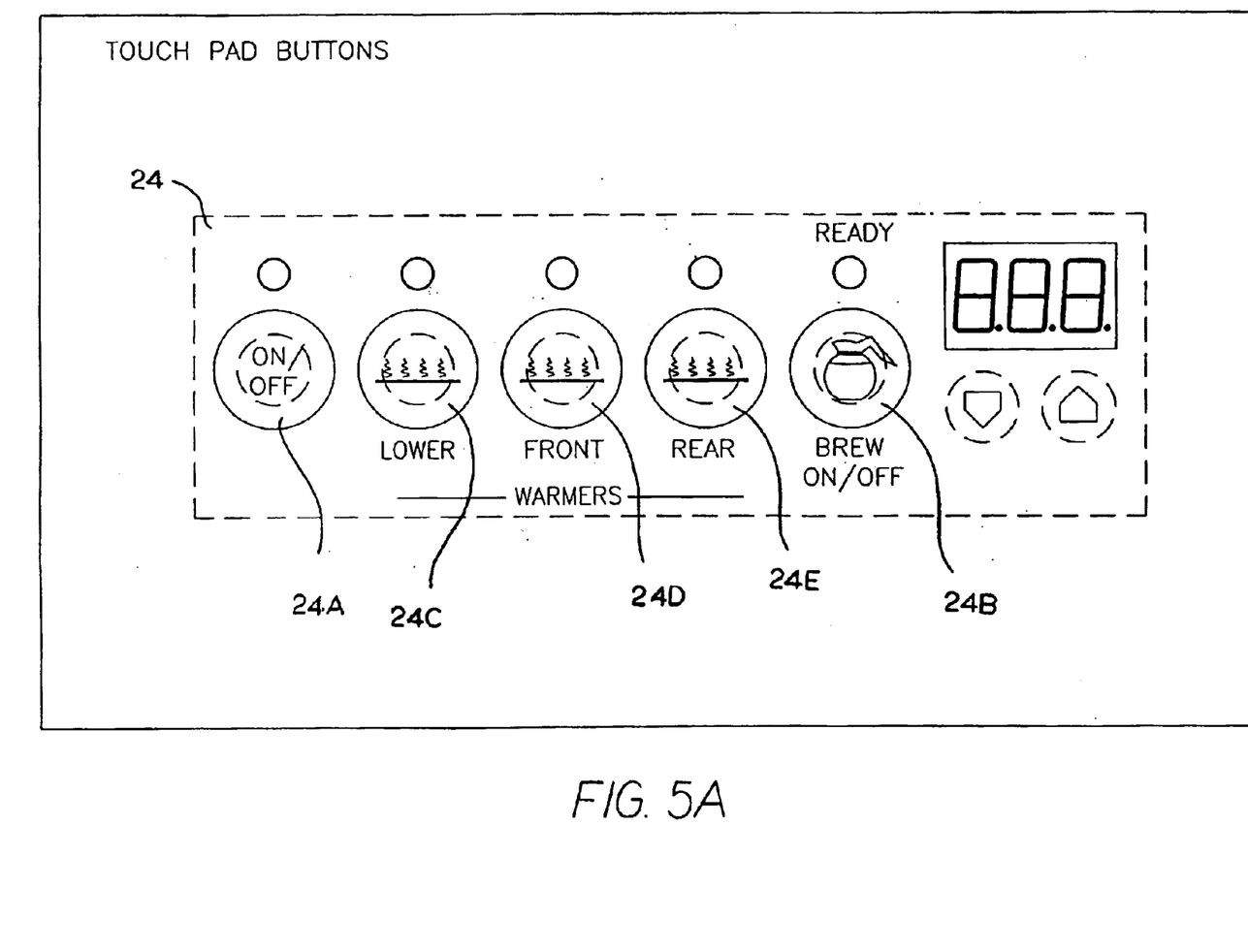
FIG. 5A is a front view of the control panel of the brewer of FIG. 1.

FIG. 5A shows the preferred embodiment of the user operated control panel 24 as a touch pad. The touch pad 24 is a double coated moisture resistant board with switches and numeric display, designed to have a decal adhered to the front identifying the use of the switches and numeric display. The touch pad 24 (as shown) can include a master on/off switch for the brewer 24A, an on/off switch for brewing coffee 24B, a control for the lower warmer plate 24C, and controls for the upper warmer plates 24D, 24E. In addition, the touch pad 24 may include other features (not shown) such as a control capable of adjusting the temperature of the heater coils 32 or a read out screen of time or temperature without departing from the spirit and scope of the present invention. In one embodiment, the touch pad 24 can be utilized to set the temperature of the reservoir through a readout on the touch pad 24 and use of adjustment buttons.

During normal operation, the brewer of the present invention operates like a typical automatic filling coffee brewer. The is, initially the controller 25 holds open the water inlet valve 44 for water to enter the reservoir 30 from the transport line 43 and supply line 42 until the water rises and touches water level sensor 34. At that level, the controller 25 closes valve 44 and no more water is allowed to enter the reservoir 30. When the water level touches the heater sensor 51, the heater circuit is enabled. The water within the reservoir 30 is heated until it reaches a predetermined temperature as measured by the thermistor 36. The water is then maintained at the predetermined temperature while resident in reservoir 30. When a beverage, such as coffee is desired, the appropriate brew button on touch pad 24 is contacted and the brew cycle is commenced. During this cycle, the brew valve 46 is opened and hot water flows from the reservoir 30 through the outlet 47 and valve 46 to the spray head 40 under hydraulic head pressure created by the water level height above the outlet 47. Once the water level drops below water level sensor 34, the controller 25 will then open valve 44 for more water to enter the reservoir 30 from the transport line 43 and supply line 42 to maintain the level of water a predetermined distance above the outlet 47 and again disable the fill valve 46 once the sensor 34 detects the water level for a predetermined time. In the preferred embodiment, these predetermined times are 7 seconds undetected and 1 second of detected water by the sensor 34. However, it should be understood that designation of the detection time does not impact the spirit and scope of the present invention. These steps provide a consistent rate of flow of water to be distributed over the ground coffee in the brew basket 20. After a set period of time the controller 25 causes the brew valve 46 to close. The water level within the reservoir will be maintained at the level of the sensor 34 until commencement of the next brew cycle.

A significant feature of the present invention is the ability of the brewer to be manually operated should water fail to enter the water reservoir 30 properly during the automatic filling cycle or in the event there is no external water supply. During any brew cycle, the controller 25 will cause the water level valve to remain open. Should water fail to enter the reservoir 30 for whatever reason, the level of water will drop below the level of outlet 47 and no further coffee will be made. This will be obvious to the user as the decanter will be holding only a partial brew. However, following a predetermined time period, the controller 25 responsive to the sensor 34 not being satisfied by contact with the water, switches the brewer to the "pour-over mode". In this mode, the water inlet valve 44 is disabled and the user is notified through a signal on the front panel 24 that the brewer is in the pour-over mode. Any partial brew in the decanter can be discarded and fresh ground coffee may be positioned in a filter within the brew basket 20. An appropriate volume of fresh water is poured into the basin 38 and moves into the reservoir 30 through the water line 48 and the inlet 50 thereby upwardly displacing the hot water to a level above that of outlet 47. Once the brew switch is activated, the brew valve 46 is opened and the hot water flows out of the reservoir 30 through the outlet 47 under the hydraulic head pressure created by the water level above the outlet 47 to be distributed over the ground coffee in the brew basket 20. The flow of water to the brew basket 20 will cease once the level of the water reaches the level of the outlet 47. As with the automatic mode, when in the manual mode, when the water level touches the heater sensor 51, the heater circuit is enabled.

An alternate structure may be used in the situation where there is no external water supply. Through the touch pad 24, the user is able to disable both the water level sensor 34 and inlet valve 44 (in a closed state). The pour-over mode may preferably be indicated visually on the panel 24. The user can then fill the reservoir 30 by pouring a sufficient volume of water into basin 38, entering directly into reservoir 30 through the water line 48 and the inlet 50. Once sufficient water has been placed into reservoir 30 so that the level is appropriately higher than outlet 47 and that contained water is heated by the heating coil 32, the brew cycle can be initiated by opening the brew valve 46. Hot water flows out of the reservoir 30 through the outlet 47 under the hydraulic head pressure created by the water level above the outlet 47 to be distributed over the ground coffee in the brew basket 20. The flow of water to the brew basket 20 will cease once the level of the water reaches the level of the outlet 47. Thereafter, the user can use the brewer 10 in a manual mode typical of hot water displacement brewers. When it is desired to shift again to the automatic filling mode, the appropriate switch on the touch pad 24 is contacted and both the sensor 34 and the inlet valve 44 are enabled.

Figure 6:
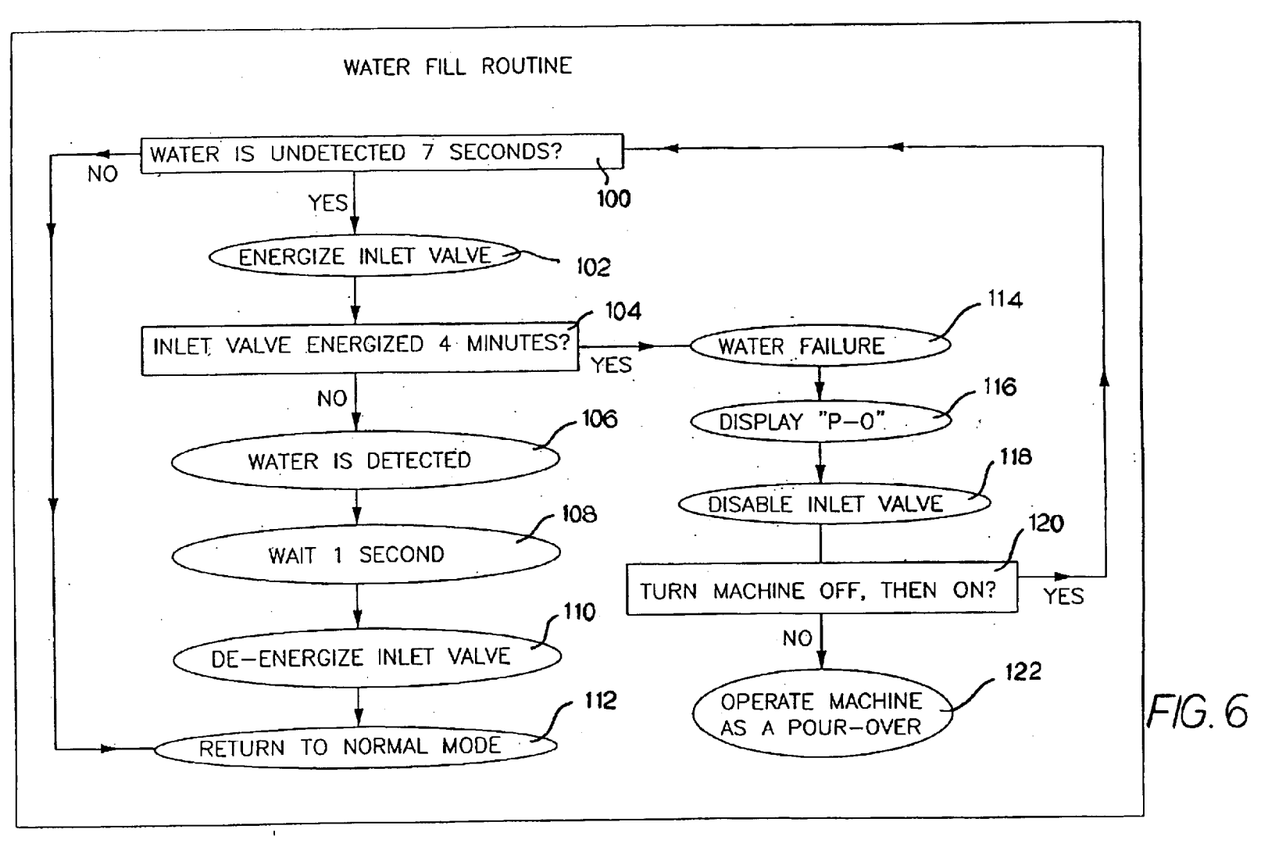
FIG. 6 is a flow chart depicting the logic flow followed by the brewer of FIG. 1 during the water fill routine.

FIG. 6 is a flowchart showing the logic of the water fill routine for the reservoir 30. The character numerals in the ensuing discussion corresponds to the sequence steps are depicted in FIG. 6. Activation of the water fill routine is dependent on water detection by the water level sensor 51. If water is undetected for 7 seconds (initial sequence 100) then the inlet valve 45 for automatic water fill operations is energized (sequence 102). The inlet valve 44 then remains energized for a period of time up to 4 minutes (sequence 104). If water is detected by the water level sensor 34 (NO) prior to completion of the 4 minute time period (sequence 106), then the controller 25 allows 1 second to elapse (sequence 108) and then de-energizes the inlet valve 44 (sequence 110) and returns to normal mode (sequence 112) for beverage brewing. If water is not detected by the water level sensor 34 (YES) by completion of the 4 minute time period (sequence 104), then the controller 25 determines that the automatic filling cycle has failed (sequence 114), causing the user operated control panel 24 to display "P-O" (sequence 116) as an indication that the user must initiate manual pour-over filling in order to fill the reservoir 30 and disabling the inlet valve 44 (sequence 118). The user has an option of refreshing the brewer 10, by turning the brewer 10 sequentially to an off position and then to an on position (sequence 120). Should this option be chosen (YES), then the water fill routine returns the water detection time frame (initial sequence 100). If this option is not chosen (NO), then the user can operate the brewer 10 in the pour-over mode (sequence 122) and manually pour fresh water into the basin 38 connected to fill the reservoir 30. It is understood that all of the various time intervals identified in FIG. 6 may be altered as desired.

Figure 7A:
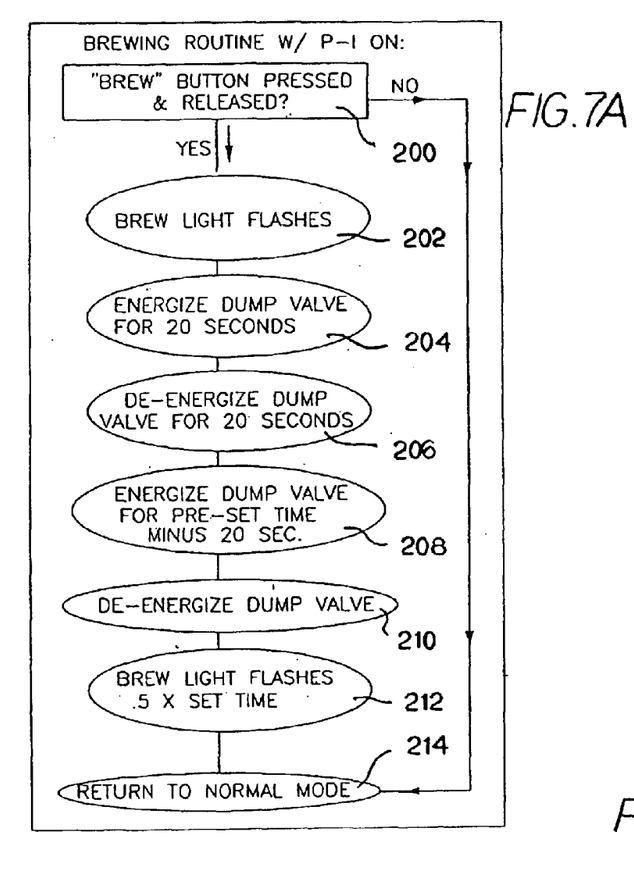
FIGS. 7A, 7B and flow charts depicting the logic flow followed by the brewer of FIG. 1 during the brewing routine.

FIG. 7A sets forth the brewing routine logic initiated by the user contacting the touch pad 24 for "brew" activation with a pre-infusion "P-I" cycle in an on position (not shown). A function behind the brew routine is to control the amount of water sprayed through the spray head 40 over the ground coffee in the brew basket 20. The P-I cycle wets the ground coffee before the full brew cycle in order to change the flavor of the brewed coffee. When the P-I cycle is activated and the brew button is sequentially depressed and then released (initial sequence 200) to activate the brew cycle, the brew light flashes (sequence 202) and the brew valve 46 is energized, feeding water into the line 49 connected to the spray head 40 and brew basket 20 for 20 seconds (sequence 204) and then the brew valve 46 is de-energized for 20 seconds (sequence 206) in order to give the water that has already entered the brew basket 20 time to be absorbed by the ground coffee. Following sequence 206, the brew valve 20 is energized for the pre-set brew time minus the 20 seconds of pre-infusion (sequence 208). When the predetermined brewing time has lapsed, the brew valve is de-energized (sequence 210) and water ceases being fed into the line 49 connected to the spray head 40 and brew basket 20. Finally, the brew light on the touch pad 24 flashes (sequence 212) indicating completeness of the brew cycle and the brewer returns to normal mode (sequence 214) for beverage brewing. It is understood that all of the various time intervals identified in FIG. 7A may be altered as desired.

Figure 7B:
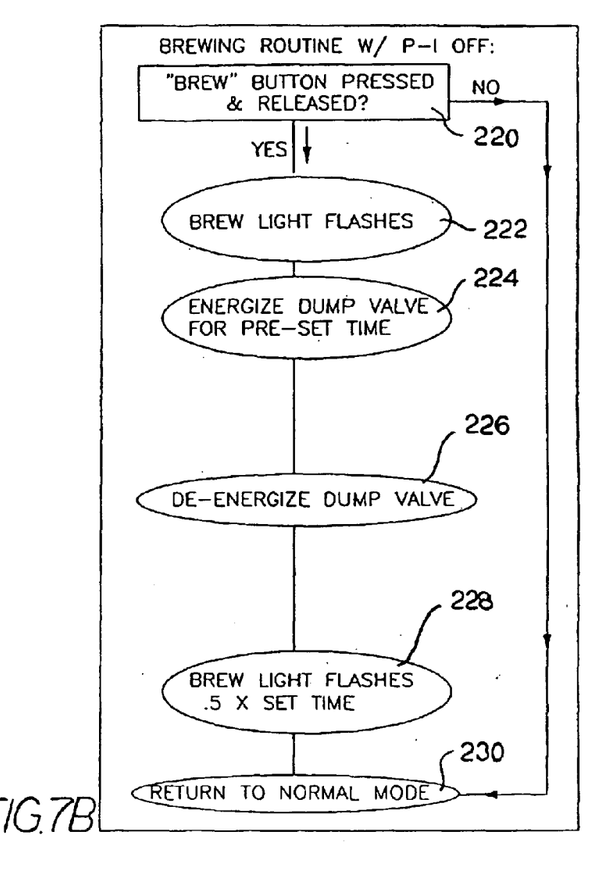

FIG. 7B shows the brew cycle with the P-I cycle in an off position. When the brew button is depressed and released (initial sequence 220) to activate the brew cycle, the brew light flashes (sequence 222) and the brew valve 46 is energized to feed water into the line 49 connected to the spray head 40 and brew basket 20 for the pre-set brew time (sequence 224). When the predetermined time has elapsed, the brew valve is de-energized (sequence 226) and water ceases being fed into the line 49 connected to the spray head 40 and brew basket 20. After this step, the brew light on the touch pad 24 flashes (sequence 228) for a period of time, indicating completeness of the brew cycle and the brewer returns to normal mode (sequence 230) for beverage brewing. It is understood that all of the various time intervals identified in FIG. 7B may be altered as desired.

Figure 8:
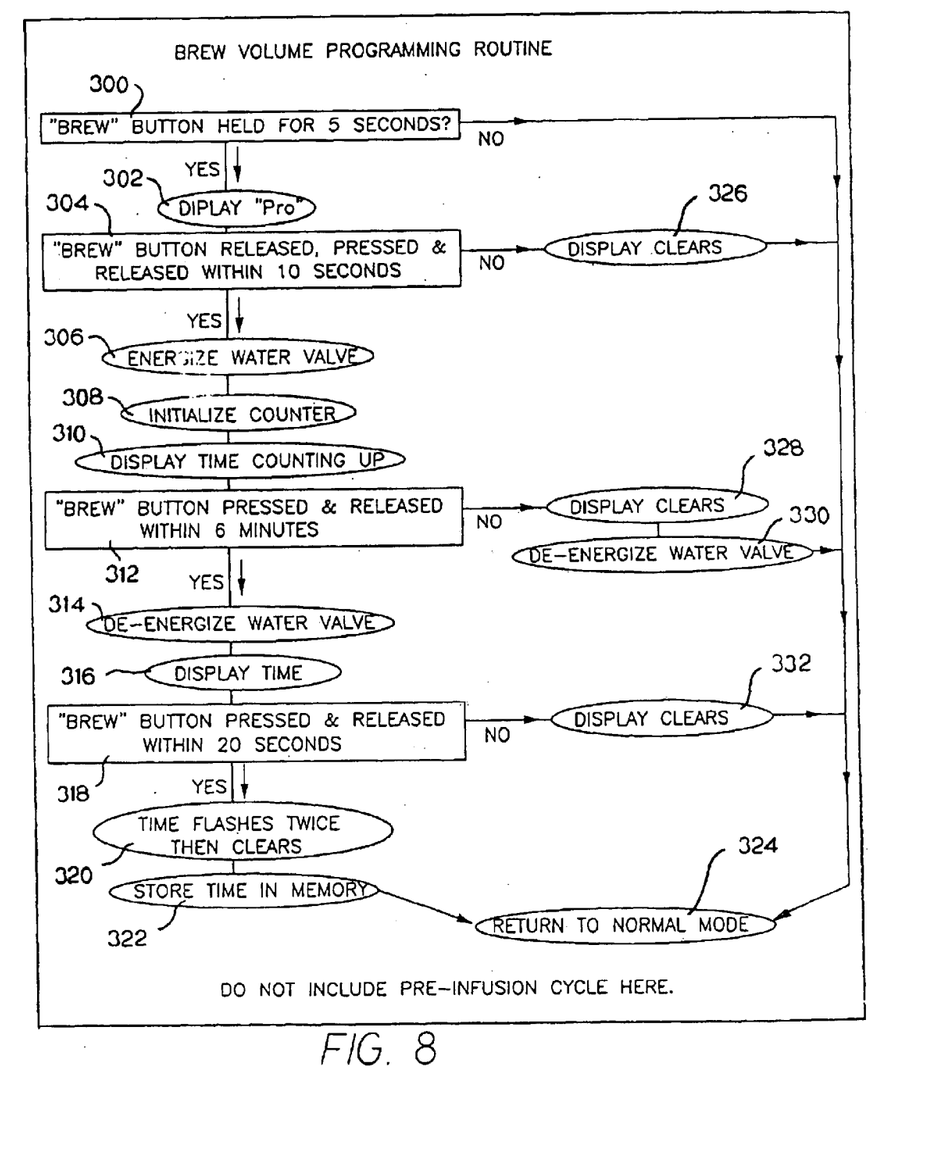
FIG. 8 is a flow chart depicting the logic flow followed by the brewer of FIG. 1 during the brew volume programming routine.

FIG. 8 shows the logic for programming the brewing time value, allowing the volume of water passing through the brew basket 20 to be programmed for uniformity of end product. The brew volume programming is initiated by a user utilizing the touch pad 24 whereby first the "brew" button is depressed for 5 seconds (initial sequence 300) to activate the programming routine, indicated by the display "Pro" 302 on the touch pad 24. It is necessary to depress the "brew" button (YES) to initiate the programming sequence. Once the "Pro" display (sequence 302) occurs, the "brew" button can be sequentially released, depressed and released again. If this release, depression and release occurs within 10 seconds (sequence 304), as indicated by YES, the water valve 44 energizes (sequence 306), the counter initializes (sequence 308) and the time counter display on the touch pad 24 begins counting up (sequence 310). The time counter display continues to count up until and unless the "brew" button is pressed and released within 6 minutes of start (sequence 312). In the event that the "brew" button is sequentially pressed and released within 6 minutes (sequence 312) a subroutine is initiated in which the water valve 44 is de-energized (sequence 314) and the time counter display on the touch pad 24 flashes the elapsed time (sequence 316). If at this point, the "brew" button is pressed and released within 20 seconds (sequence 318 or YES), the time counter display flashes twice and clears (sequence 320) and the time is stored in memory (sequence 322) as the brew volume program and the brewer 10 is returned to normal mode (sequence 324) for beverage brewing. It is understood that all of the various time intervals identified in FIG. 8 may be altered as desired.

There are multiple places along the logic chart of programming the brew volume routine that the programming process can be aborted (NO) without having a brew volume routine saved to memory. In the initial step (sequence 300), if the "brew" button is not held for 5 seconds (NO), no information is saved into memory and the brewer 10 returns to normal mode (sequence 324) for beverage brewing. In addition, if programming mode is activated (sequence 302), and the "brew" button is not released, depressed and released (sequence 304) within 10 seconds (NO) then the time counter display clears (sequence 326) and the water valve 44 is de-energized and the brewer 10 returns to the normal mode (sequence 324) for beverage brewing without any brew volume program stored in the memory. Next, if the "brew" button is not pressed and released (sequence 312) within 6 minutes (NO) of the time counter display counting up (sequence 310), the time counter display clears (sequence 328) and the water valve 44 is de-energized and the brewer 10 returns to the normal mode (sequence 324) for beverage brewing without any brew volume program stored in the memory. Finally, if after the brew time has been established (sequence 316), the "brew" button is not pressed and released (sequence 318) within 20 seconds (NO), the time counter display clears (sequence 332) and the brewer 10 returns to the normal mode (sequence 324) for beverage brewing without any brew volume program stored in the memory. While FIG. 8 has identified time periods, these periods can be adjusted in application without departing from the spirit and scope of the present invention.

Figure 9:
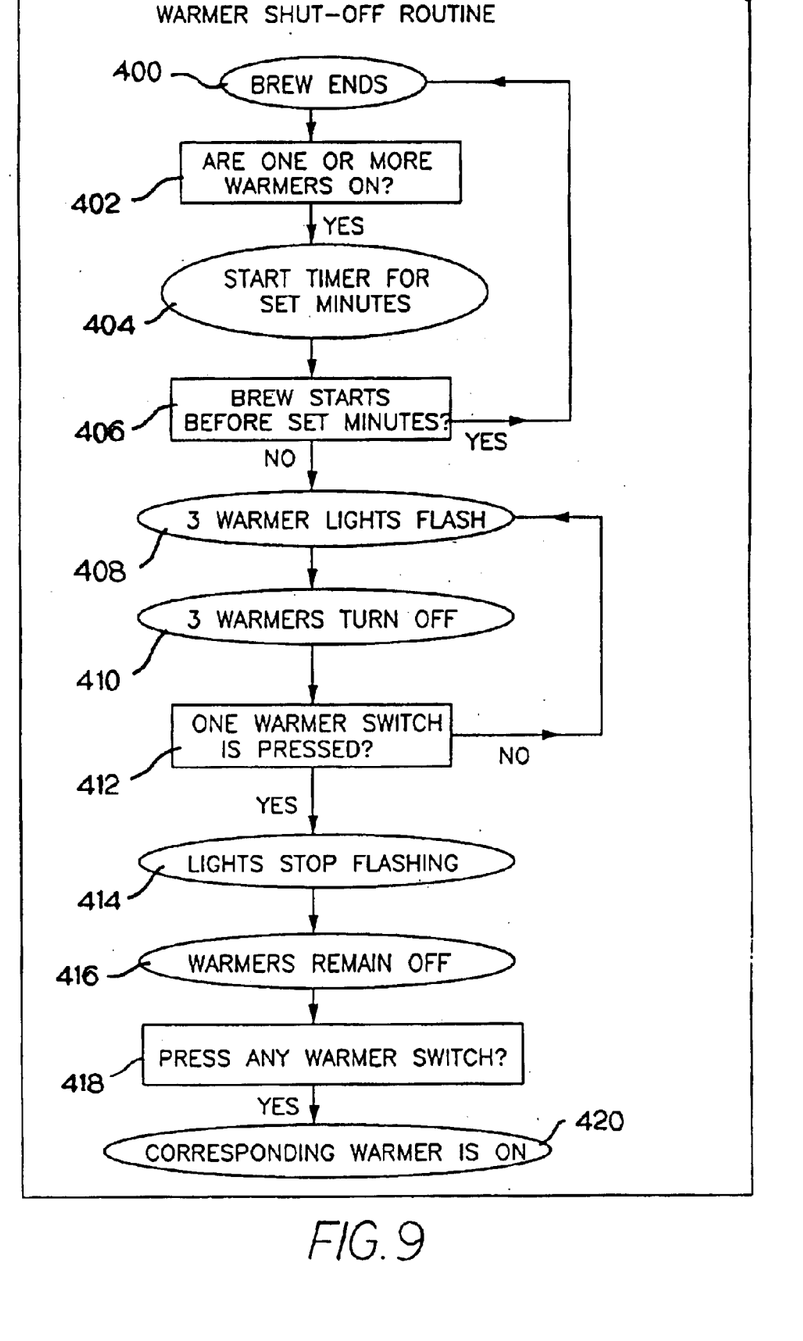
FIG. 9 is a flow chart depicting the logic flow followed by the brewer of FIG. 1 during the warmer shut-off routine.

FIG. 9 shows the logic for the warmer shut-off routine. The warmer shut-off routine is initiated once the brew cycle ends (initial sequence 400). Once the brew cycle ends (initial sequence 400), the controller 25 identifies whether one or more warmers are in an on position (sequence 402). If one or more warmers are found in an on position (sequence 402 or YES), a timer is initiated for shutting-off of the warmers (sequence 404). If the brew cycle is initiated again (sequence 406) before the completion of the timer for programmed shut off of the warmers (YES), the warmer shut-off routine returns to a start position (initial sequence 400) and waits for the brew cycle to end. If the brew cycle is not initiated again (sequence 406) before the completion of the timer for programmed shut off of the warmers (NO), up to 3 warmer lights will flash (sequence 408) and the correlating warmers will turn to an off position (sequence 410). After the warmers are in an off position (sequence 410), the user can depress a warmer switch (sequence 412 or YES) and the warming lights will stop flashing (sequence 414) with associated warmers remaining in an off position (sequence 416), not to be reactivated until a warmer switch is depressed (sequence 418 or YES) and the warmer is activated (sequence 420) to an on position. If, while the warmers are in an off position (sequence 410) a warmer switch is not pressed (sequence 412 or NO), up to 3 warmer lights will continue to flash (sequence 408) indicating that the warmers have been turned off (sequence 410), but not acknowledged by any warmer switch depression (sequence 412 or YES). While not shown in FIG. 9, the option for the warmer shut-off routine may be disabled and the predetermined time for warmer shut-off is programmed by the user.

What is claimed is:

1. A beverage brewer having two modes of operation, an automatic mode in which water automatically flows into a reservoir for heating the water and is dispensed over a beverage concentrate during a brew cycle and a manual mode in which water is manually dispensed over the beverage concentrate during said brew cycle, said brewer further comprising:
    (a) a hot water distribution system for receiving hot water from said reservoir and distributing said hot water over said concentrate;
    (b) a water sensor positioned within said reservoir for sensing the presence of water when it reaches a predetermined level in said reservoir and initiating a water present signal; and
    (c) a control system responsive to a user initiated signal and to the water present signal for moving hot water from said reservoir to said distribution system, said control system converting to a manual mode when said water present signal is not received in a predetermined time period following the distribution of hot water over the beverage concentrate and causing an indication signal to be visually displayed whereby said brew cycle is initiated by the manual introduction of hot water into said hot water distribution system.

2. A beverage brewer having two modes of operation, an automatic mode in which water automatically flows into a reservoir for heating the water and is dispensed over beverage concentrate during a brewing cycle and a manual mode in which water is manually added to said brewer and dispensed over the beverage concentrate during said brewing cycle, said brewer further comprising:
    (a) a water level sensor positioned within said reservoir for sensing the presence of said water;
    (b) a water replacement system including a water inlet valve in communication with said reservoir, said system adapted to be placed into contact with a remote source of water;
    (c) a water basin in communication with said reservoir;
    (d) a brewing system including a water outlet, a brewer valve, and a hot water distribution component for distributing hot water from said basin over the beverage concentrate held in a brew basket;
    (e) a controller for controlling multiple functions of said brewer; and
    (f) a user operated control panel for providing a brew signal to said controller and for displaying the status of certain operations of said brewer, said controller in response to said brew signal opening said brewer valve whereby said hot water flows to the distribution component for distribution, said controller after a fix predetermined time period opening said water inlet valve to maintain the level of water in said reservoir above said water outlet to said brewer valve, closing said brewer valve following a second predetermined period of time, and closing said water valve when said water level sensor senses the presence of water, and, in the event said sensor does not sense said water level after a third predetermined time period, said controller causing said brewer to enter the manual pour-over mode by closing said water valve and causing said control panel to display a change to said manual mode whereupon the user readies the brewer for manual operation culminating in the manual pouring of a predetermined volume of water into said basin.

3. The beverage brewer as recited in claim 2, wherein said water replacement system further comprises a supply line in communication with said remote source of water and a transport line connected to a bottom portion of said reservoir, wherein said supply line of the water replacement system can be disabled.

4. The beverage brewer as recited in claim 3, wherein a manual water replacement system can be utilized once said supply line is disabled, with water poured into said water basin, said water then directed into the reservoir through said transport line, thereby upwardly displacing the hot water to a level above outlet to said brewer valve.

5. The beverage brewer as recited in claim 2, wherein said water basin communicates with said reservoir by a connected water line and inlet into said reservoir.

6. The beverage brewer as recited in claim 2, wherein said hot water distribution component can be controlled to limit the amount of water distributed into the brew basket, including a pre-including cycle which distributes water into the brew basket for a predetermined period of time before the initiation of the brewing cycle, said water being distributed over said beverage concentrate contained within said brew basket.

7. The beverage brewer as recited in claim 2, wherein the brewing system includes a programmed brewing time value, said value corresponding to a volume of water passing through the brew basket.

8. The beverage brewer as recited in claim 2, wherein said controller is connected to a thermistor to monitor the water temperature within the reservoir and when said thermistor sends a signal to the controller that the water temperature needs adjustment, the controller then sends a signal to a heater relay to allow a heating coil with in the reservoir to operate.

9. The beverage brewer as recited in claim 8, wherein said controller establishes the heating range of the water within the reservoir for the duration of the brewing cycle.

10. The beverage brewer as recited in claim 2, wherein said controller has a counter that counts the number of brews made in the brewer.

11. The beverage brewer as recited in claim 10, wherein said counter is linked to said user operated control panel for display on the same.

12. The beverage brewer as recited in claim 2, wherein the brewer further comprises an automatic decanter warmer shut-off process after a predetermined time past the completion of the brew cycle.

13. A coffee brewer having an automatic mode of operation, in which water automatically flows into a reservoir for heating the water and is dispensed over ground coffee during a brewing cycle, and a manual mode of operation, in which water is manually added to said brewer and dispensed over the ground coffee during said brewing cycle, said brewer further including
   (a) a water level sensor extending into said reservoir for the presence of said water;
   (b) a water replacement system including at least one water inlet valve in communication with said reservoir;
   (c) a brewing system including a water outlet, a brewer valve, and a hot water distribution component for distributing hot water over the ground coffee held in a brew basket;
   (d) a controller for controlling multiple function of said brewer; and
   (e) a user operated control panel for providing a brew signal to said controller and for displaying the status of certain operations of said brewer;
   wherein said controller responds to said brew signal opening said brewer valve whereby said hot water flows to said distribution component for distribution over said grounds, said controller after a first predetermined time period opening said water inlet valve to maintain the level of water in said reservoir above said water outlet to said brewer valve, closing said brewer valve following a second predetermined period of time, and closing said water valve when the water level contacts said water level sensor, and, in the event that water does not contact said water level sensor after a third predetermined time period, said controller causing said brewer to enter the manual mode by closing said water valve and causing said control panel to display a change to said manual mode whereupon the user readies the brewer for manual operation culminating in the manual pouring of a predetermined volume of water into said basin.

* * * * *

UNITED STATES PATENT AND TRADEMARK OFFICE
CERTIFICATE OF CORRECTION

PATENT NO. : 6,752,069 B1
DATED : June 22, 2004
INVENTOR(S) : Burke et al.

It is certified that error appears in the above-identified patent and that said Letters Patent is hereby corrected as shown below:

Column 8,
Line 36, replace the word "fix" with -- first --.
Line 62, add the word "the" between the words "above" and "outlet".

Column 9,
Line 2, replace the word "pre-including" with -- pre-inclusion --.
Line 16, replace the words "with in" with -- within --.

Column 10,
Line 11, replace the word "function" with -- functions --.

Signed and Sealed this

Thirtieth Day of November, 2004

JON W. DUDAS
*Director of the United States Patent and Trademark Office*